INVENTORS:
Christian Georges Delarue
Boris Sokoloff
Edmond Paul Warnery

Karl F. Ross
Attorney

PERIPHERALLY SUPPORTED DISC FILE

INVENTORS:

Christian G. Delarue
Boris Sokoloff
Edmond P. Warnery

Karl F. Ross
Attorney

INVENTORS:

Christian G. Delarue
Boris Sokoloff
Edmond P. Warnery

Karl F. Ross
Attorney

INVENTORS:

*Christian G. Delarue*
*Boris Sokoloff*
*Edmond P. Warnery*

*Karl G. Ross*
*Attorney*

INVENTORS:

Christian G. Delarue
Boris Sokoloff
Edmond P. Warnery

Karl F. Ross
Attorney

INVENTORS:

Christian G. Delarue
Boris Sokoloff
Edmond P. Warnery

Karl F. Ross
Attorney

INVENTORS:

Christian G. Delarue
Boris Sokoloff
Edmond P. Warnery

Karl F. Ross

Attorney

INVENTORS:
Christian G. Delarue
Boris Sokoloff
Edmond P. Warnery

Karl G. Ross
Attorney

United States Patent Office 3,550,102

Patented Dec. 22, 1970

3,550,102

PERIPHERALLY SUPPORTED DISC FILE

Christian G. Delarue, Meudon, Boris Sokoloff, Fontenay-aux-Roses, and Edmond P. Warnery, Boulogne-sur-Seine, France, assignors to Societe Generale du Vide, Choisy-le-Roi, France, a corporation of France Filed Oct. 11, 1966, Ser. No. 585,890
Claims priority, application France, Oct. 12, 1965, 34,554
Int. Cl. G11b *5/48, 5/60, 15/64*
U.S. Cl. 340—174.1 28 Claims

ABSTRACT OF THE DISCLOSURE

The invention relates to peripherally supported disc file. In this system a disc is "mounted" for high-speed rotation and has circumferential record tracks formed in a recording medium such as a magnetic coating or film provided on its side faces. Information-transfer means such as a set of magnetic heads are supported in cooperating relationship with the recording medium so as to read, erase and inscribe prescribed information in the tracks. The disc is supported for rotation in a centerless manner, without positive restraint against limited axial displacement. Lateral positioning members are mounted for limited axial displacement relative to the disc and include pressure-fluid-discharge orifices which coact with the adjacent disc faces to control the axial distance between these disc faces and a reference plane of the lateral positioning members. Information-transfer heads are fixedly mounted in the lateral positioning members so that a precisely determined operating clearance is maintained between the heads and the recording medium on the disc faces.

BACKGROUND OF THE INVENTION

In conventional disc-type magnetic memory assemblies as currently used in computers and other information-processing systems, a plurality of memory discs are usually mounted in axially spaced, stacked relation on a common shaft. Cooperating with the circumferential record tracks formed in the magnetic coating on each side face of each disc, there is usually provided a single magnetic head, or a single set of a few magnetic heads, mounted for indexable radial scanning displacement across the disc side surface. The magnetic heads are for this purpose secured in support members or shoes universally supported adjacent the disc side face from an arm which is movable stepwise to effect the desired indexed radial scanning displacement. For maintaining the prescribed uniform spacing between the head-support member and the disc side surface, aerodynamic forces created by the high-speed rotation of the disc are generally relied on. That is, the support member is held in angled relation to the plane of the disc so as to present a definite contour with respect to said plane, thereby causing the boundary layer of air entrained by the revolving disc to exert an aerodynamic pressure tending to push the support member away from the disc. This air pressure is balanced by the force of a light mechanical or fluidic spring urging the support member towards the disc. The spring force, the speed of disc rotation and the profile of the support member are so predetermined in relation to one another that the balance of forces holds the support member at the prescribed airgap spacing from the disc side surface.

While magnetic disc memories have important advantages over alternative types of memory systems in many applications, their utility has been seriously limited by certain disadvantages inherent the conventional construction just outlined. The precise centered mounting of a disc on a center shaft is a long and tedious operation, which is one of the reasons for the usual mounting of a plurality of stacked discs on a common shaft as noted above. This type of mounting however makes it difficult or impossible to substitute one disc for another in the memory unit, as would be highly desirable for the flexibility of programming operations, e.g. for the substitution of files and the like.

Access time both for the reading-out and for the entering of information is relatively long, owing to the very small number of magnetic heads that can be associated with each disc side face with the construction described, and the consequent necessity of radially indexing the heads. It would be very much preferable if a full complement of heads could be fixedly associated with the record medium on each disc side face, sufficient in number to serve all of the record tracks thereon without requiring radial indexing or scanning. This has not generally been found practicable heretofore.

Maintaining a narrow, uniform and constant airgap between the magnetic heads and disc surfaces by the conventional aerodynamic means described above is found to be difficult because of the weakness of the aerodynamic forces developed even at very high rotational speeds. Long and delicate adjustments are necessary. Even then, the extremely narrow airgaps that would be desirable for maximum information density and optimal performance of the memory cannot be reliably maintained without danger of occasional physical contact between the magnetic heads and the disc and consequent damage to the delicate record medium.

It has previously been attempted, in a magnetic disc memory of the type referred to, to maintain the prescribed uniform airgap between the magnetic heads and the disc side face by discharging jets of pressure air from orifices in the head-supporting members against the disc side face. The pressure forces thus created are considerably more powerful, and would hence appear to be more reliable, than the weak aerodynamic forces utilized in the arrangement last referred to. However, such earlier attempts have been unsuccessful because it was not found possible in practice to hold the disc side surface in a constant, fixed plane to within the tolerances required in order to enable the head-supporting members to follow up any lateral positional fluctuations of said side surface under the effect of the fluid-pressure forces. Using the utmost care in the machining of the disc side surfaces, and the mounting of the disc on its shaft, up-to-date mechanical techniques make it possible to attain tolerances of the order of $\pm 10$ microns in the position of the plane of the disc side surface. Such positional fluctuations, small as they are, are still much too large to enable the head-carrier members to follow up such positional fluctuations in response to the pressure forces in order to maintain the desired small and uniform airgaps, in view of the inertia of said members.

DESCRIPTION OF THE INVENTION

Objects of this invention are to remove the above-mentioned limitations of conventional disc memory systems; to reduce the positional fluctuations of the plane of the disc side surface to a range of not more than about $\pm 1$ micron, while at the same time greatly simplifying the mechanical problems involved in the manufacture and mounting of the discs; to provide disc memories wherein the gap between the information-transfer heads and the record medium can easily be made as low as about 3 microns, and can easily be maintained at this extremely small value to within a tolerance of $\pm 1$ micron. Consequent objects include the provision of disc memories having increased a higher information density and information-storage capacity than heretofore; to provide such disc memories in which the information-transfer heads can be mounted at fixed positions respectively associated with each of a great number of record tracks on the disc, thereby eliminating the need for scanning movement of the heads, and correspondingly reducing the access time of the memory device. Further objects relate to the provision of disc memory assemblies in which the discs are readily and quickly removable, and interchangeable among a large number of similar memory units constituting a memory-disc array, with enormous advantage to the flexibility, versatility and general efficiency of information-processing operations. Other objects will appear.

An exemplary embodiment of the invention will now be described with reference to the accompanying drawing wherein.

Figure 2:
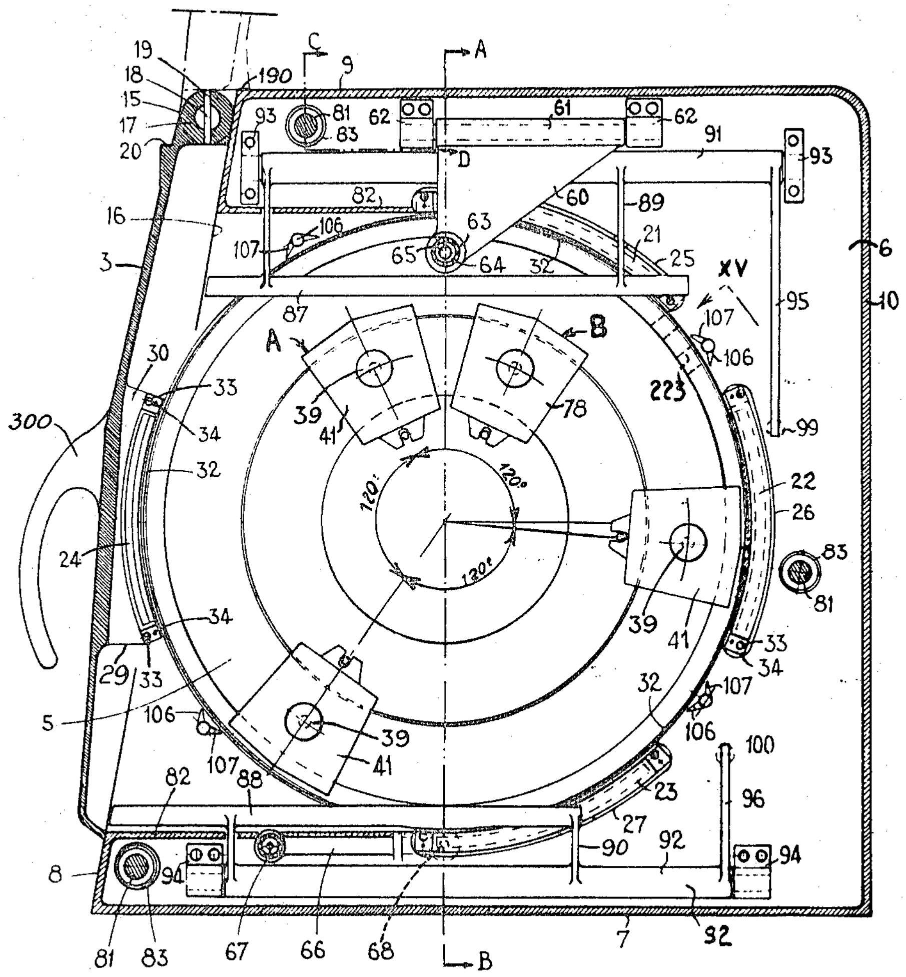
FIG. 2 is a sectional view on a plane normal to the axis of disc rotation, showing the interior of one of the memory cells.
Figure 3:
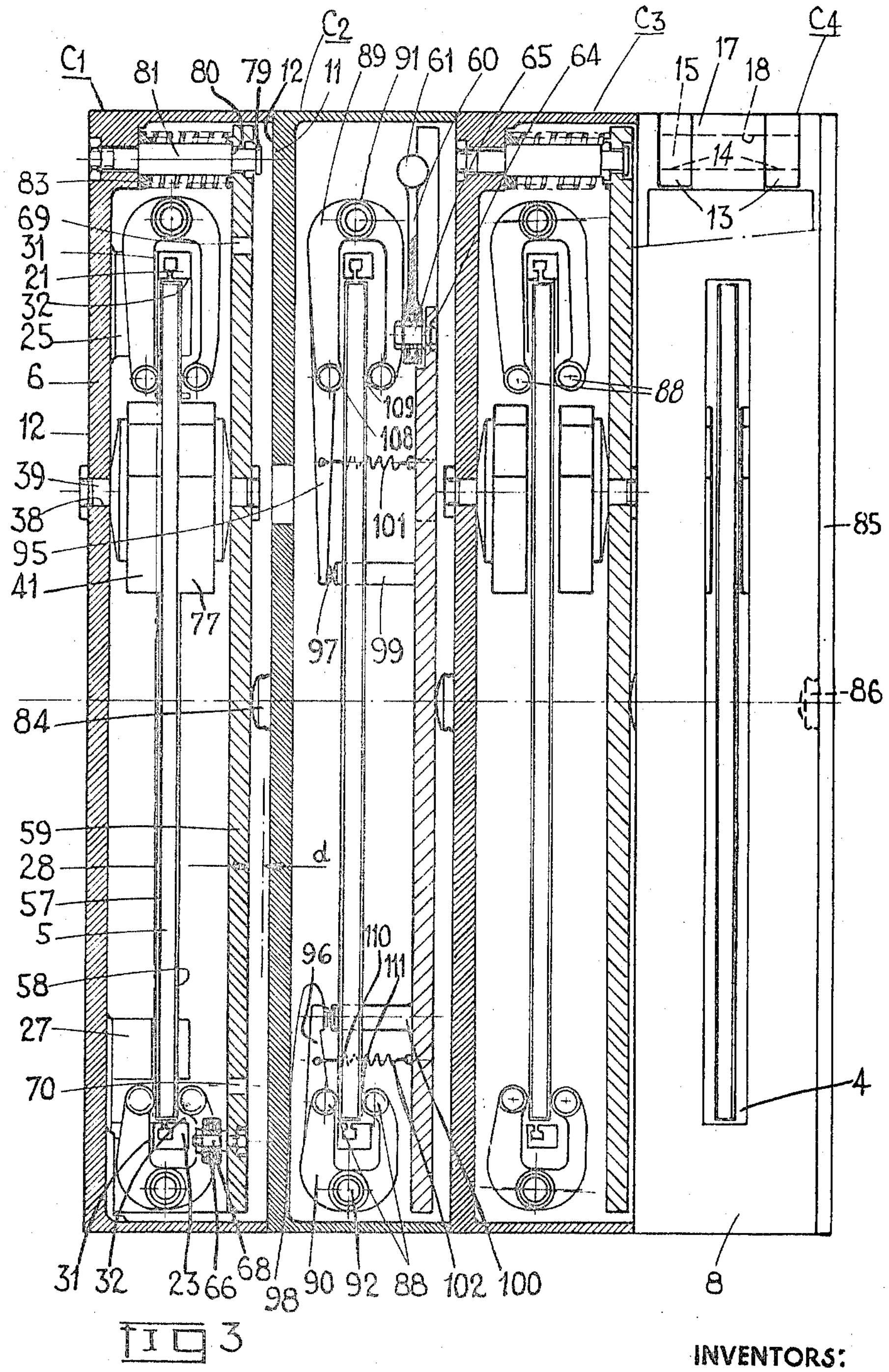
Figure 5:
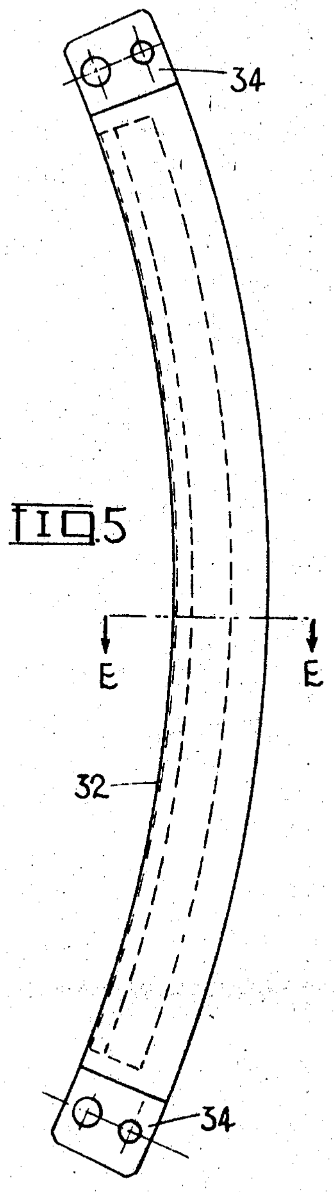
Figure 6:
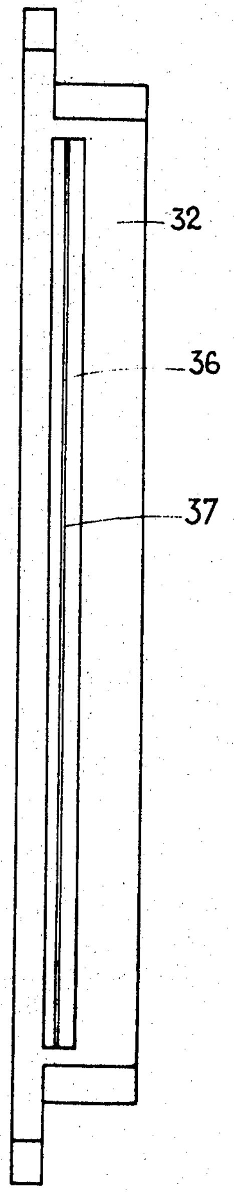
Figure 7:
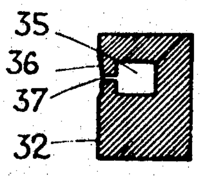
Figure 4:
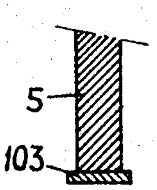
Figures 8, 9, 11:
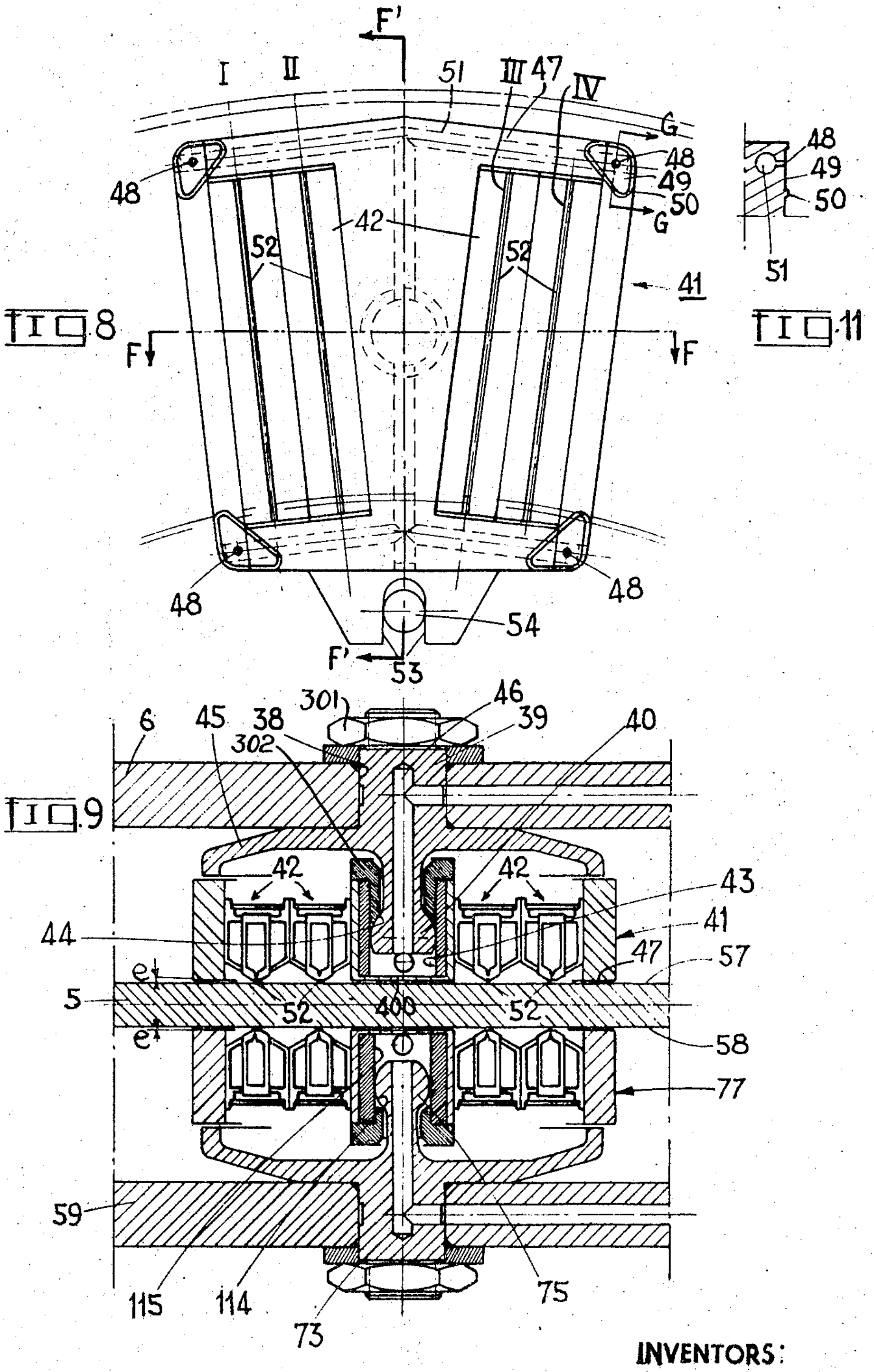
Figure 10:
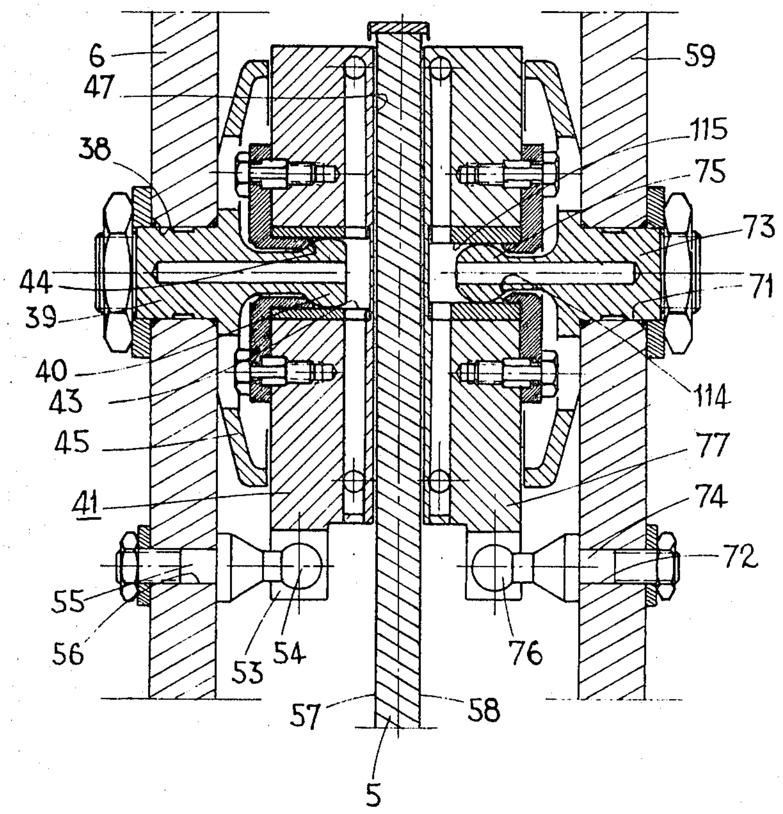
Figure 12:
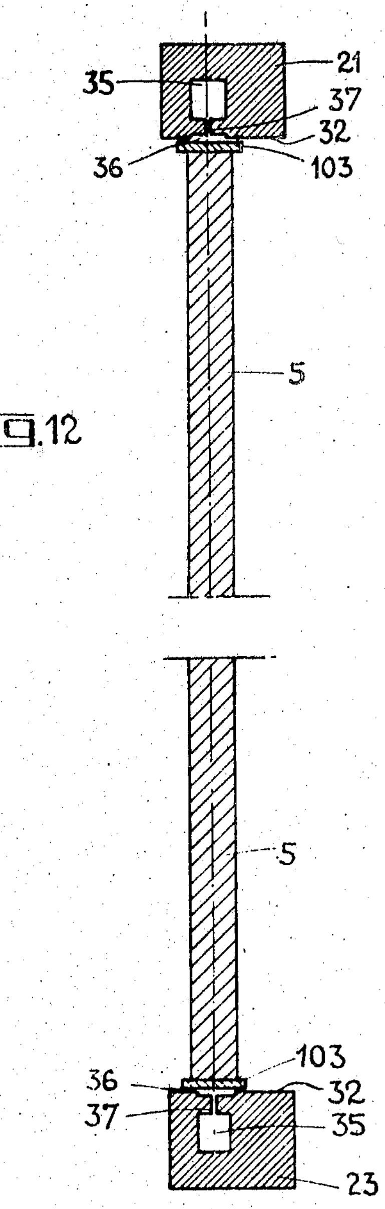
Figure 13:
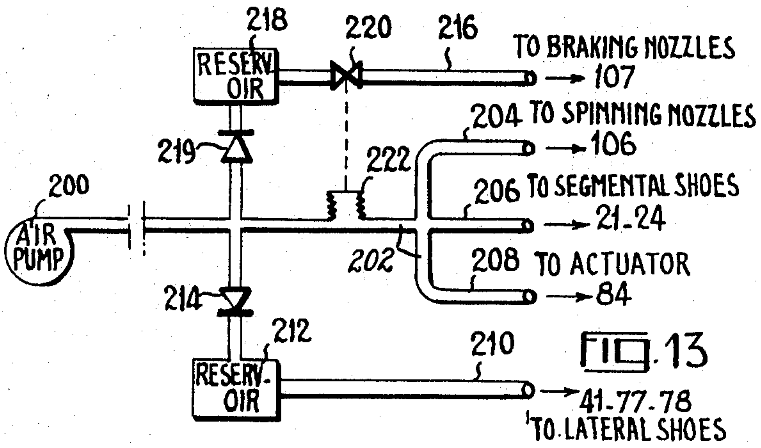
Figure 14:
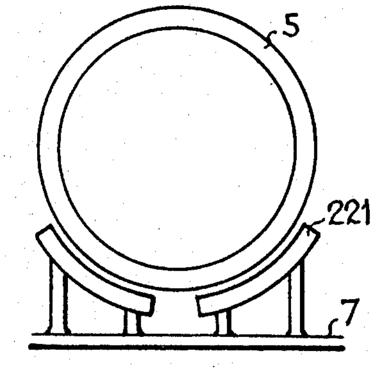
Figure 15:
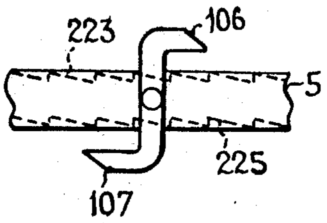
Figure 16:
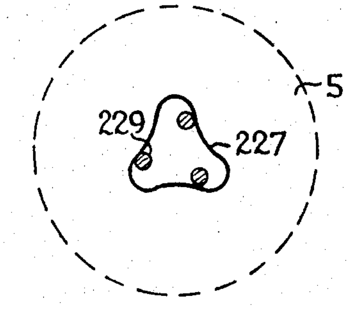

FIG. 3 is a corresponding sectional view projected upon the plane of FIG. 2, showing four adjacent memory cells C1–C4; cell C1 is shown in section generally on the line CDB of FIG. 2, in the operative position of the parts; cell C2 is generally a section on the line AB of FIG. 2, in the operative position; cell C3 is shown in section on the same line as C1 but simplified and with the parts shown in the idle disc-inserting and disc-removing position; and cell C4 is an outer view, with the hinged cover removed in the lower part of the figure; in each of the cells shown, certain parts have been omitted for clarity;

FIG. 4 shows a peripheral part of the memory disc in section in a radial plane;

FIGS. 5, 6 and 7 are large-scale views of a segmental centering shoe, FIGS. 5 and 6 being elevations at right angles to each other and FIG. 7 a section on line EE of FIG. 5;

FIG. 8 is a front view of a lateral positioning shoe or magnetic head-support member;

FIG. 9 is a corresponding view showing two registering support members on opposite sides of the disc, in section on line FF of FIG. 8;

FIG. 10 is a corresponding view in section on line F'F' of FIG. 8;

FIG. 11 is a detail view in section on line GG of FIG. 8;

FIG. 12 is a schematic sectional view illustrating the centerless support of the disc in a diametric plane; and FIG. 13 is a schematic of the fluid-supply system, illustrating a safety feature;

FIG. 14 is a simplified small-scale view showing a modified arrangement of the centerless disc-supporting means;

FIG. 15 is a fragmentary view, according to arrow XV of FIG. 2, illustrating the paired drive and brake means; and FIG. 16 is a simplified small-scale view showing a coupling arrangement for use with a modification involving an electric motor for spinning the disc.

Figure 1:
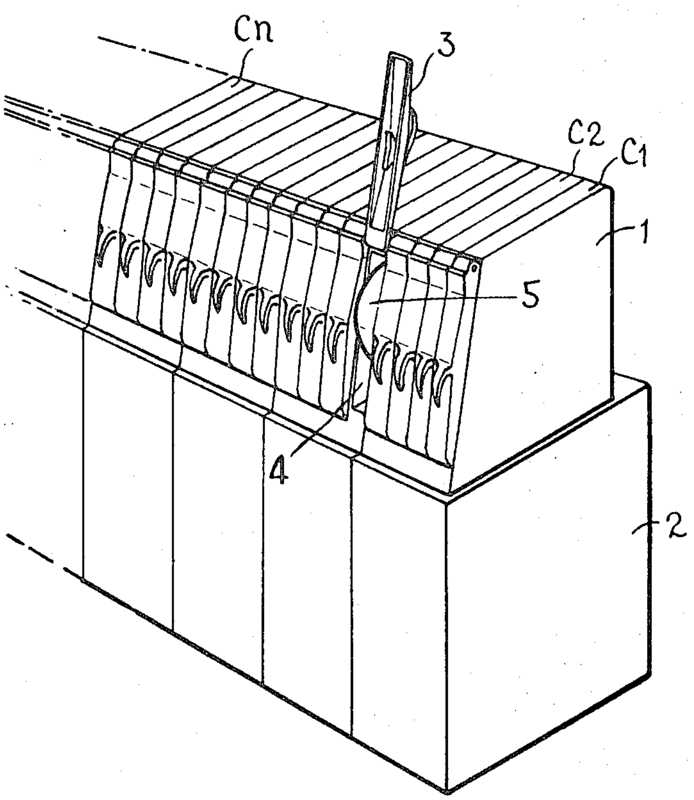
FIG. 1 is a small-scale perspective view of part of a disc memory array according to the invention, with one of the memory cells shown open.

As partially shown in FIG. 1, a magnetic storage or memory assembly according to the exemplary embodiment of the invention being described is generally designated 1, and comprises a series of identical units or cells designated C1, C2 . . . C*n* mounted in side-by-side juxtaposed relation upon a common base 2.

Each memory cell C comprises a relatively narrow upstanding casing of generally flat rectangular shape with its narrow front side slanting somewhat away from the vertical and formed with a slot-like window 4 provided with a cover 3 hinged about a horizontal axis at the top of the casing. The hinged cover 3 is externally provided with a handle as shown for convenient manipulation.

In FIG. 1, one of the covers 3 is shown raised to its open position so as to reveal a memory disc 5 positioned in the corresponding cell casing, for rotation in a vertical plane, through means later described.

In FIGS. 2 and 3, the casing of a typical cell is shown as including a single sidewall 6 one side of which is integrally flanged to define a horizontal bottom wall 7, a slanting front wall 8 in which the afore-mentioned opening 4 is formed, a flat horizontal top wall 9 and a vertical rear wall 10. The narrow walls or flanges 7 through 10 have their free edges bounded by a vertical plane parallel to the plane of sidewall 6, these edges engaging the outer surface of the side wall 6 of an adjacent cell casing, as will be apparent from FIG. 3. The mating surface or plane of joint, designated 11, is carefully trued in the prescribed vertical plane. The sidewall 6 likewise has its mating outer surface trued as shown at 12 in a corresponding vertical plane. Thus the casings of the adjacent cells can be assembled through any suitable means in accurately mating juxtaposed relation upon the common base 2.

As shown in FIG. 3 in connection with the rightmost one, C4 of the four cells there shown, and also in FIG. 2, the front wall 8 of each casing is formed with a pair of spaced integral lugs 13 having aligned holes 14 through which extends a hinge pin 15. The cover 3 is shown in FIG. 2 as having a trued inner edge surface 16 capable of mating accurately with the rectified outer surface of front wall 8 in the closed position of the cover. Latching means, not shown, may be provided for the cover when closed. The cover 3 is formed with an integral lug 17 at its top having a hole 18 therein, through which hinge pin 15 extends for hinging cover 3 to the casing. Hinge pin 15 is shown keyed for rotation with cover 3 by means of a cotter pin 19, and as being freely rotatable in the aligned holes 14. A shoulder 20 formed on cover 3 below lug 17 is positioned to engage with a surface portion 190 of top casing wall 9 in the open position of the cover. The center of gravity of cover 3 and its handle 300 is so positioned that the cover is stably supported in both its closed and open positions.

The memory disc 5 is made of non-magnetic rigid material, such as suitable metal, ceramic, glass or plastic, nylon and Teflon being especially convenient materials. The disc has accurately machined parallel flat sides coated with suitable magnetic composition. The cylindrical peripheral surface of the disc is likewise machined to close diametric tolerances. The disc may be provided with a peripheral protective rim 103 (see FIG. 4) projecting somewhat beyond the flat side surfaces of the disc, to facilitate stacking of the discs in storage. The disc 5 is supported for high-speed centerless rotation within its casing through pressure-fluid bearing means as will now be described.

The assembly is shown to include four segment-shaped disc-bearing and centering shoe members 21 to 24. Shoes 21, 22 and 23 are secured to the fixed walls of the cell casing while shoe 24 is secured to the hinged cover 3. The four shoe members have precisely machined inner segmental-cylindric surfaces which, when the shoes are properly positioned, accurately define a common cylindrical surface which is designated 32.

The inner surface of vertical sidewall 6 is formed with three bosses 25, 26, 27, which have surfaces trued in a common vertical plane 28 parallel to the trued outer surface 12 of sidewall 6. The cover 3 likewise has a boss 29 with a trued surface 30 in said common plane 28 when the cover 3 is in closed position. Each of the segmental shoes has a flat bearing face 31, normal to the axis of cylindrical surface 32, which mates with trued faces 28 and 30 of the bosses when the shoes are secured to the bosses by means of screws 33 and a pair of locating pins 34.

For assembling the segmental shoes 21 to 24 in their precisely positioned relationship, there is conveniently provided a gauge disc, not shown, having a diameter precisely equal to the nominal diameter of the memory discs 5 plus the pressure-fluid operating clearance between the disc periphery and the inner surface of the shoes; this last clearance may be of the order of a few hundredths of one millimeter. The gauge disc is securely positioned relative to the casing by way of an appropriate jig, the segmental shoes 21 to 24 are engaged with the cylindrical surface of the gauge disc, the attaching screws 33 are screwed tight and the locator pins 34 are inserted after suitably counterboring the shoes and associated bosses 25 to 29, respectively. The procedure outlined is advantageous in that it substantially eliminates the effect of manufacturing tolerances on the relative positioning of the bearing means in the respective cells.

The detailed construction of one of the segmental shoes 21 through 24 is shown in FIGS. 5 to 7. As will be especially apparent from FIG. 7, the shoe is formed with a longitudinal cavity or chamber 35, e.g. of the rectangular cross section shown, extending over a major part of the arcuate length of the shoe. The part-cylindrical inner surface 32 of the shoe is further formed with a shallow recess or groove 36 having a depth of the order of a few hundredths of one millimeter and communicating with the cavity 35 by way of calibrated orifice means, conveniently a continuous longitudinal slot of calibrated width. Groove 36 is narrower than disc rim 103. In the operation of the device, a suitable pressure fluid, such as air, is supplied to the interior of cavity 35 through suitable supply conduit means not shown, at a controlled pressure, and the pressure of the fluid discharge through the slot 37 is uniformly distributed throughout the segmental recess or groove 36 which is laterally overlapped by the periphery of disc 5 (i.e. the overhanging rim 103) at all stages of operation. The supply conduits (not shown) connected with cavity 35 are amply dimensioned to introduce only a very low pressure drop, and the pressure obtaining in cavity 35 will therefore be substantially the same both when the disc 5 is mounted in position and when the disc 5 is removed so that the slot 37 discharges freely into the atmosphere.

The segmental shoes 21–24 may also be mounted on their supports in positions that are circumferentially tilted in a common direction by a small, equal angle. This angle can be so predetermined, in relation to the angular velocity of disc rotation and other factors, that after the disc has been set in rotation and is spinning at its prescribed speed, the supply of air to the air chambers 35 of the segmental shoes 21–24 can be cut off. The boundary film of air entrained by the periphery of the disc is then forced into the wedge-shaped spaces defined between the cylindrical inner surface of each tilted shoe and the disc periphery, generating a pressure which will in some cases be found sufficient to provide the desired centerless support of the disc without having to continue the feed of air from the pressure source to the shoes as described above.

In accordance with yet another modification, diagrammatically illustrated in FIG. 14, there is only provided a single pair of segment-shaped peripheral supporting shoes, generally designated 221. The shoes are mounted through means not shown so as to embrace only a bottom arc of the disc 5, symmetrically disposed with respect to the vertical plane through the disc center. Each of the shoes 221 may be constructed generally similarly to the shoes 21–24 described above. The pressure of the air jets discharged from both shoes 221 in this case is balanced by the weight of the disc. The pair of shoes 221 may be replaced with a single shoe if desired.

For the lateral positioninv of disc 5, and for supporting the magnetic heads, there are provided two opposite sets of lateral positioning members, or side shoes, respectively designated 41 and 77. For reasons that will become clear later, the members of set 41 may be termed backing members, and the members of set 77 applicator members. As shown, there are three backing members 41 arranged at 120° angles on one side of the disc, three applicator members 77 being arranged at corresponding positions on the opposite side so as to be in respectively opposed relation to the backing members.

There is here provided a fourth pair of opposed members, generally similar to members 41 and 77, one of which is visible at 78 in FIG. 2. Both members of this fourth pair are functionally comparable to the applicator members 77 rather than to the backing members 41 for reasons that will be indicated in detail later.

The backing members 41, as well as the fourth member 78, are mounted from the associated sidewall 6 of the casing so as to be freely displaceable to a limited extent in directions parallel to the disc axis, and also for limited swiveling movement about axes parallel to the disc surface, while being prevented from rotation about an axis parallel to the disc axis and from translational displacements in a plane normal to the disc axis, as will later be described in detail.

The four applicator members 77 on the opposite side are mounted in similar manner from a vertical plate 59 (also see FIG. 3) which in turn is movable in a direction parallel to the disc axis between a projected, operative position (shown for cells C1 and C2 in FIG. 3) and a retracted position (shown for cell C3) in which the disc 5 is readily insertable and removable.

All of the lateral positioning members or shoes 41, 77, 78 carry magnetic heads 42 as later described.

For the mounting of side shoes 41 and 78, the sidewall 6 of the cell casing is formed with four precisely located and dimensioned holes 38. Received in the holes 38 are cylindrical shanks 39, suitable secured against rotation in the holes, as by way of the screw-thread and nut means 301 shown in FIG. 9. The shanks 39 are formed at their ends projecting into the casing with a spherical head 40 having its center accurately coinciding with the geometric axis of shank 39. Sphere 40 is received in a central bore 43 of shoe 41 with extremely low clearance by way of an annular wear insert as shown. An annular retainer insert 302 is received in bore 43 and has a flange engaging the outer end of said bore, this insert being provided with a bevel surface 44 engaging the spherical surface of head 40 to retain the shoe against axial movement beyond an endmost position without preventing the flow of fluid therepast.

Universal movement of shoe 41 about the sphere 40 is further restricted by means of a cup-shaped annular flange 45 formed integrally with shank 39 and having an outer surface engaging the surface of sidewall 6. Cup-shaped flange 45 has an axially projecting rim engageable with a surface of shoe 41.

Shank 39 is further formed with an axial duct 46 which as shown is connected by way of a radial port 303 with a fluid-delivery passage formed in sidewall 6. Axial duct 46 discharges at the inner end of spherical head 40 into a space defined between the flat end surface of said head and a flat end-sealing crosswall 400. The fluid-delivery arrangement thus described is, according to the invention, preferred to the use of a flexible delivery line as would otherwise be required, since such a flexible line would be liable to introduce a thrust variable with fluid pressure which would in turn disturb the accurately predetermined magnetic airgap defined between the magnetic heads carried by the shoe 41 and the magnetic surface of disc 5 as will presently appear.

The shoes 41 have fixedly mounted therein the magnetic heads such as 42 (FIG. 9), later described in greater detail. The magnetic heads are precisely located relatively to the central positioning bore 43 of the shoe 41. The shoe 41 has an inner end face 47 which is precisely trued to lie on a plane at a distance *e* from the trued face of disc 5, and the magnetic heads 42 are mounted so that their magnetically active end faces 52 are located in that plane of face 47. As shown in FIG. 8, the end face 47 of shoe 41 is of generally trapezoidal shape surrounding the magnetic heads which are arrayed in four generally radial rows I, II, III, IV as more fully described below. The side edges of the trapezoidal face 47 stably support the magnetic heads and protect the active end surfaces 52 thereof from contact with the surface of disc 5.

The surface 47 of shoe 41 is formed with fluid-discharge ports 48 at its four corners, the ports opening into shallow recesses 49, a few hundredths of a millimeter deep, formed at said corners of the trapezoidal surface 47, which recesses are bounded by surrounding flat lips 50 accurately located in a common plane with the active surfaces or tips 52 of the magnetic heads, the plane of the lips 50 constituting the reference plane for the location of the active surfaces 52 of the magnetic heads. The discharge ports 48 are connected with fluid-delivery manifold passages 51 formed in shoe 41 as seen in FIGS. 11 and 10, said passages connecting with the axial fluid delivery duct 46 and being of relatively wide sectional area to introduce a very low pressure drop as earlier mentioned. Thus, the information transfer heads 42 are mechanically connected with the nozzles 48–50 by a shoe 41 mounted with freedom of minor axial displacement on a holder 40, 45.

Means are provided for blocking and precisely locating the shoe 41 in angular position about an axis normal to disc 5, including a lug projecting from a side of shoe 41 and having a recess formed with a pair of parallel flat facing side surfaces 53 which straddle a spherical head 54 provided on a shank 55 secured in a bore 56 in the casing wall 6, in a manner clearly apparent from FIG. 10. The relative positions of locator faces 53 with respect to the magnetic heads, the center of sphere 54 relative to the axis of shank 55, and the position of bore 56 with respect to the bore 38 are determined to extremely close tolerances, and the gauge disc previously referred to may be mounted in place of the disc 5 in order to determine with the requisite accuracy the correct relative positions of the bores 56 and 38. Thus the disc 5 will be both accurately centered within the segmental shoes 21 to 24 and laterally positioned with one side against the three backing shoes 41, so that it will assume a precisely determined position within the cell casing. The spherical swivel mounting means disclosed serve to eliminate the disturbing effect of surface defects of the disc 5 upon the "osculating" relation of the reference surface 47 of lips 50 with respect to the disc surface 57.

The applicator side shoes 77 of the opposite set are generally similar to the backing side shoes 41 just described and are mounted symmetrically with respect thereto on the opposite side surface, 58, of disc 5 as will be apparent from FIG. 9. However, said applicator side shoes 77 are mounted from the aforedescribed plate 59 which is displaceable towards and away from the disc 5 in a direction normal to the disc, through means now to be described with reference especially to FIGS. 2 and 3.

A generally triangular flange 60 is pivoted about an axis parallel to the plane of disc 5 by means of a pivot pin 61 rotatably supported in bearings 62 secured to casing wall 6, near the top of the casing. In FIG. 3, flange 60 is assumed to have been removed from the two cells C1 and C3 and said flange and its associated parts are best seen in cell C2 of FIG. 3. Flange 60 is formed with a hole 63 near its free apex in which a small spherical ball bearing 64 is swivelably mounted. A pin 65 secured in the inner race of bearing 64 is secured to an upper part of plate 59. The geometric axis of pin 65 is located in a vertical plane extending substantially through the axis of disc 5 and through the center of gravity of the suspended assembly including plate 59 and side shoes 77 mounted on it. Flange 60 is mounted for rotation about pivot pin 61 without having any axial or radial clearance with respect to the fixed structure of the casing, and pin 65 is journaled in flange 60 without having any clearance thereon radially, i.e. towards or away from the pivot pin 61. Means are further provided for constraining the freely suspended plate 59 to remain in a plane parallel to disc 5, and such means include a rod 66 (see FIGS. 2 and 3) which is generally horizontal and parallel to disc 5. Rod 66 is fitted near its ends with swivel ball bearings in which pins 67 and 68 respectively, are rotatable without radial clearance. The pins 67 and 68 are respectively secured to casing wall 6 and plate 69, and are normal to the plane of disc 5. Pin 68 has its geometric axis positioned in a common vertical plane with the suspension pivot 61 and the center of gravity of the assembly comprising plate 59 and shoes 77 mounted thereon.

The bearings 62 of pivot pin 61, swingably support the suspension flange 60, and the pin 67 connecting rod 66 with the casing sidewall 6, are secured to said sidewall by means of screws and locator pins so that the movable plate 59 is positioned with high precision relative to the casing structure including the centering shoes 21 to 24 and side shoes 41. The position of plate 59 can be accurately located by means of a pair of reference holes 69 and 70 (FIG. 3) drilled at selected points near the top and bottom of the plate.

Plate 59 is further formed with four pairs of bores, 71 and 72 respectively, the bores 71 serving to receive the shanks 73 of the shoes 77, and bores 72 receiving the shanks of locator swivel heads 76, as shown in FIG. 10. The centers of the bores 71 and 72 are precisely located relative to the reference bores 69 and 70 by means of a suitable gauge.

As mentioned above, the four applicator side shoes 77 are generally similar to the backing side shoes 41 earlier described in detail and are fitted with magnetic heads as described in connection with shoes 41. The sole difference between shoes 77 and shoes 41 is that the swivel heads 75 of shoes 77 are somewhat smaller in diameter than the swivel heads 40 of shoes 41, as is apparent from FIGS. 9 and 10, the reason for this difference being indicated at a later point.

As earlier indicated, there are provided three backing side shoes 41 positioned on radii spaced 120° apart adjacent the side surface 57 of disc 5, and three applicator side shoes 77 positioned adjacent the opposite side surface 58 of the disc, in opposing, registering relation to the side shoes 41. There is further provided a fourth applicator side shoe of set 77 and an opposite side shoe, designated 78 (see FIG. 2), cooperating with disc face 57 and supported from sidewall 6 as are the side shoes of backing set 41, but constructed similar to the shoes of applicator set 77. The pair of opposing shoes 77 and 78 are here shown positioned on a radius which is symmetrically related to the radius on which the uppermost one of the three first-mentioned pairs of side shoes 41, 77 are positioned, on the opposite side of the vertical plane passing through the center of disc 5, as shown in FIG. 2. The bores receiving the swivel shanks serving to connect shoe 78 to sidewall 6 are drilled on centers that are located by means of the same gauge as that serving to locate the shoes 41. It will be understood that all of the side shoes associated with a given side surface of memory disc 5 are identically positioned in respect to the peripheral centering shoes 21–24, in all of the memory cells of the assembly, through the use of a common drill gauge for drilling the locating bores such as 43 and 53 on one side, and 71 and 72 on the other side of the disc.

It will be recalled that the plate 59 supporting the shoes of set 77 is displaceable, in a direction normal to the plane of disc 5, between a projected (operative) position and a retracted (load-unload) position. The displacement of plate 59 in this direction is limited by a pair of stops 79 and 80 formed as opposite shoulder surfaces on each of three pins 81 fixedly projecting from spaced peripheral points of sidewall 6, as will be apparent from FIGS. 2 and 3. The pins 81 have reduced-diameter neck portions between the stop shoulders 79 and 80, which neck portions extend freely through corresponding holes formed in plate 59, so as to restrict the axial displacement of plate 59. The pins 81 are disposed substantially 120° apart around the axis of disc 5, at radial distances therefrom substantially greater than the disc radius. A coil spring 83 surrounds each of the pins 81, urging the movable plate 59 away from the disc 5. The plate 59 and the shoes 77 supported by it can be shifted axially towards the disc 5, in opposition to the springs 83, by an axially movable actuating finger 84 mounted centrally in the sidewall 6 of the cell casing adjacent to the one considered, said finger being projectable by the action of fluid-pressure means, not shown. In connection with the last memory cell of a memory assembly, and as shown for cell C4 in FIG. 3, the casing structure is terminated by an end wall or cover plate 85, and the related actuator finger 86 is then mounted in said cover plate.

Means are provided for mechanically centering the disc 5 between its opposite sets of side shoes 41–78 and 77 when plate 59 is in its retracted position. The mechanical centering means comprises an upper pair of guide rails 87 and a lower pair of guide rails 88, the guide rails in each pair extending across a horizontal chord of the disc 5 on opposite sides of the disc. The spacing between the guide rails in each pair is slightly greater than the width of the rim 103 of disc 5 so as to center the disc with some clearance. The guide rails 87 and 88 of each pair, spanning the rim 103, are elongated members interconnected by a fork or yoke structure 89 and 90, respectively, each yoke structure being integrally connected to a corresponding shaft 91, 92, extending centrally of each yoke structure, parallel to the guide rails. The shafts 91 and 92 are pivoted for rotation about horizontal geometric axes extending substantially in the midplane of disc 5, by means of respective pairs of bearings 93 and 94 secured to the fixed casing structure near the top and bottom thereof. Lever arms 95 and 96 project from the respective shafts 91 and 92 and are provided at their free ends with contacts or stops 97 and 98 engageable with the outer ends of stop posts 99 and 100 projecting from plate 59. Traction springs 101, 102 connected between the said plate and the lever arms urge the stops 97, 98 into engagement with the stop posts 99, 100.

As an alternative to the construction shown and just described, the shafts 91 and 92 may be pivotally supported from movable plate 59 and the stop posts 99 and 100 would then be secured to sidewall 6 instead of plate 59.

For reasons that will later appear, the lever arms 95 and 96 are so dimensioned that the radial distance from the end stops 97, 98 thereof to the geometric axis of the respective shafts 91, 92 is substantially twice the radial distance from said axes to the contact points of guide rails 87 and 88 with the rim 103 of disc 5.

For driving the disc 5 in rotation, there is illustrated in FIGS. 2 and 15 an air drive comprising air-discharge nozzles 106 mounted from the casing wall in angularly spaced positions around the disc. The nozzles 106 are oriented to direct air jets against a serrated marginal annular surface 223 formed around one side of the disc. Means are also provided for braking the rotation of the disc. As shown, there are provided braking nozzles 107 mounted similarly to drive nozzles 106 but directed in the reverse direction so that the jets discharged by them will impinge on reversely disposed serrations 225, similar to serrations 223, on the opposite side of the disc. Valve means, not shown, are provided for selectively supplying compressed air to drive nozzles 106 or brake nozzles 107.

As an alternative to the air drive means just described, electrical drive means may be used for spinning the memory disc. For example, a suitable electric motor of flat construction (not shown) may be fixedly secured to a casing wall. The motor drive shaft may be releasably coupled to the disc by way of a universal releasable coupling of the kind schematically indicated in FIG. 16. As there shown, the disc 5 is formed in its central region with a recess 227 of generally triangular, curvilinear, contour. Three driver fingers 229, constituting plungers mounted for axial displacement on a flange (not shown) carried by the motor drive shaft, can be bodily engaged with the sides of recess 227, or retracted to a disengaged position. When engaged as shown in FIG. 16, the drive fingers 229 will couple disc 5 for rotation with the motor shaft without impeding its centerless, floating condition in the mounting means of the invention.

As earlier noted, the side shoes 41, 78 and 77 carrying the magnetic heads are mounted in each cell with very close dimensional tolerances so as to be positioned substantially identically with respect to the disc-supporting means in all of the cells. This ensures that the memory discs are interchangeable between all of the cells. As also indicated earlier, the precise, uniform positioning of the side shoes relative to the peripheral shoes 21–24 is achieved through the use of a single, unitary gauge in the form of a master disc having an outer diameter equal to the nominal diameter of a memory disc 5 plus the prescribed operating clearance. The disc is drilled with locating holes corresponding in relative position to the positions of the bores such as 38, 56, 71 and 72 that are to be drilled both in the fixed casing wall 6 and in the movable plate or wall 59 for supporting the side shoes as earlier described. The master gauge disc may further be drilled with locator holes corresponding to the reference holes 69 and 70 in movable plate 59. A preferred procedure will now be described for machining and assembling the memory device disclosed above, with the help of a gauge disc of the type just described.

The master gauge is first firmly secured through any suitable means to the blank constituting the casing wall 6, having the hinged cover 3 attached thereto. The segmental disc-centering shoes 21–24 are then mounted on the related bosses 25, 26, 27 and 29 on wall 6 and cover 3, as earlier described, and are blocked in positions such that the inner surfaces 32 of the segmental shoes engage the periphery of the gauge disc. The casing wall 6 is then drilled and reamed with suitable tools projecting through the appropriate locating holes formed in the gauge disc, so as to produce the holes such as 38 and 56 in said wall 6. The gauge disc is then removed from its attachment with wall 6 and is, similarly, firmly secured to the blank constituting movable wall 59 (while the latter is held in its approximately correct position by way of a crude positioning jig). The holes such as 71 and 72 in movable wall 59 are drilled and reamed by way of the corresponding locator holes in the gauge disc. The parts serving to connect movable plate 59 to fixed wall 6 as earlier described, including mainly the suspension flange 60 and link 66, are then definitively secured to the plate 59. The plate 59, still attached to the master gauge disc and having the associated connecting parts secured to it, is then connected to the fixed wall 6 with the gauge disc centered by means of the segmental centering shoes 21–24 as indicated above, whereupon the center axes of the locating holes in the gauge disc are placed in accurate alignment with the holes that were drilled in wall 6 as just described. This last aligning operation is conveniently effected with the helping of standard locator pins simultaneously engaging the holes drilled in movable wall 59, the locator holes in the gauge disc, and the holes drilled in wall 6. At this stage, the above-mentioned connecting parts including suspension flange 60 and link 66 are secured to the fixed casing structure by means of nuts and bolts and are blocked by means of blocking pins engaging corresponding trued surfaces of the casing. The master gauge disc is then removed, and the remaining components are assembled in any convenient sequence.

When it is desired to load a memory disc 5 into the assembled cell to operate the memory assembly, the hinged cover 3 is lifted to its open position, and the desired memory disc 5 is inserted into the cell using a special manipulator device, not shown, which will prevent damaging the delicate magnetic coatings on the side faces of the disc. It is noted that, during this insertion step, the application of fluid pressure to actuator 84 and to the centering and side positioning shoes is cut off, and consequently the movable plate 59 is urged by springs 83 into its retracted position remote from the end wall 6, as shown for cell C3 in FIG. 3, thereby permitting insertion of the memory disc between the pairs of guide rails 87 and 88. This insertion is facilitated by the provision of lower and upper runways 82 (see FIG. 2) formed in the casing in positions to be rollingly engaged by the bottom and top regions of the periphery of disc 5.

It is important at this point to note that the mechanism herein disclosed for interrelating the displacements of the guiderails 87 and 88 with the displacements of the movable plate 59, in directions axially of the disc, operates to ensure automatically that the side shoes 41, 78 and 77 remain at all times uniformly spaced from the opposite sides of the memory disc 5 during and after insertion of the disc into its operative position, thereby assuring protection of the magnetic coating thereon. This will now be shown as follows.

The total axial displacement of movable plate 59 as permitted by the opposing stops 79 and 80 on the pins 81, from the operative position nearest end wall 6 (shown for cell C1 in FIG. 3) to the retracted position farthest from said end wall (shown for cell C3 in FIG. 3), is designated *d*. In the former of these two end positions, the side shoes 41, 78 and 77 are positioned in operative fluid-pressure relationship with the sides 57 and 58 of disc 5. The yokes 89 and 90 are held in upright position by the cooperation of stop posts 99, 100 with the tips of arms 95, 96, so that the round guiderails 87 and 88 are positioned with their innermost generatrices 108, 109 and 110, 111 in guiding relationship with the rim 103 of memory disc 3. In the retracted position of movable plate 59, shown for memory cell C3, the lever arms 95, 96 are still held in contact with posts 99, 100 by the action of the springs 101, 102, so that the yokes 89 and 90 are tilted rightward as here shown. Since, as described above, the distance from the geometric axis of each of the yoke fulcra 91, 92 to the contact points (108, 109 and 110, 111) of guiderails 87 and 88 with disc rim 103 is substantially one-half the radial distance from each of said axes to the contact points of the arms 95, 96 with posts 99, 100, it will be apparent that in this tilted condition of the yokes 89, 90 the guiderails 87 and 88 now hold the disc 3 in an intermediate position wherein the side shoes 41, 78 and 77 are spaced by equal clearances ½*d* from the confronting sides 57 and 58 of the memory disc 3. Hence, during the insertion of disc 3 between the guiderails, it is ensured that the side shoes remain clear of the magnetic coatings on the disc faces, and there is no danger of damage to said coatings.

When the disc 3 has thus been inserted into its operative position, the hinged cover 3 is lowered to its closed position, whereupon the memory disc is firmly and reliably retained in the operative position by the cooperation of the four segmental shoes 21–24. Now the fluid pressure is applied to provide the desired fluid-bearing support of disc 3 and the disc is set in rotation. These operations are effected as follows.

The application o fair pressure in the air chambers 35 of the four segmental centering shoes 21–24 supports the disc 5 in a manner that will be best understood from FIG. 12, in which the upper and lower centering shoes 21 and 24 are assumed for simplicity diametrically opposed. The air-pressure-supply system, shown diagrammatically in FIG. 13 and described hereinafter, is arranged to maintain a substantially constant regulated pressure within the chambers 35. This pressure value is so predetermined that the sheet-like air jet issuing through the slot 37 of the lower segmental shoes 23 will create in the associated shallow recess 36 a uniform pressure acting against disc rim 103, sufficient to overcome the weight of the memory disc 5. The opposing air pressures from segmental shoes 21 and 24 acting on the top and bottom of the disc rim hold the disc in a balanced, floating condition, any tendency of the disc to approach closer to one of the shoes causing an increase in the pressure of the air jet generated by that shoe and a decrease in the air pressure from the other shoe, so that the floating equilibrium is restored. A similar action occurs in the horizontal direction between the shoes 22 and 24. The dimensions and other parameters of the system are so determined that the average air pressure applied over the peripheral surface of disc rim 103 is preferably about one-half the regulated pressure value $p$ established by the air supply system in chamber 35. The operation is generally similar in the modified embodiment of FIG. 14.

Air pressure is also applied to the lateral shoes 41, 77 and 78 in order to position the floating disc laterally in relation to the magnetic heads mounted in said shoes. In the initial condition when the actuator 84 is deenergized and movable wall 59 hence retracted as shown for memory cell C3 in FIG. 3, there is a relatively wide gap between the active surfaces of said lateral shoes and the side faces 57, 58 of disc 5, and in this condition it will be understood that the air jets issuing from the corner ports such as 48 (FIG. 11) of each side shoes 41, 77 and 78 are inoperative to produce any effective action against the disc faces. In this condition, therefore, the central air jets discharged through the axial ducts such as 46 (FIG. 9) act against the end sealing crosswalls such as 400 to generate an axial biasing force which urges the bevel surfaces 44 and 114 of the shoes toward the adjacent annular areas of the spherical swivel heads 42 and 75. As earlier described, means are provided to allow leakage of the air past said bevel surfaces 44 and 114, as by roughening these surfaces. Thus in this initial condition all the lateral shoes on both sides of the memory disc are supported in projected positions in which their bevel bearing surfaces 44, 114 are in engagement with the swivel heads 40, 75. It is noted that the shoes 41 and 78 are so dimensioned that, in this initial projected condition, t he active surfaces 50 of shoe 78 are positioned somewhat closer to the disc surface 57 than the active surfaces 50 of shoes 41.

Fluid pressure is now progressively applied to the actuator 84, so that movable wall 59 is shifted (leftward in the drawing) from the retracted position shown for cell C3 in FIG. 3 to the operative position shown for cells C1 and C2. Through the described mechanism including abutments 99 and 100, arms 95 and 96 and yokes 89 and 90, this movement of wall 59 causes disc 5 to be shifted in the same (leftword) direction by the action of guiderails 87 and 88, so that disc surface 57 is brought closer to the active surfaces of shoes 41 and 78. At the same time, this displacement of wall 59 bring the shoes 78 supported thereby closer to disc surfce 58.

It is noted that during this movement of movable wall or plate 59, the latter does not necessarily remain strictly parrallel to a given plane.

As the active surfaces 50 of the lateral shoes of both opposite sets approach the disc surfaces 57 and 58, the action of the air jets from the corner ports 48 of each shoe against the adjacent disc surface 57 or 58 increases sharply and prevents direct mechanical contact between the shoe surfaces 50 (and the active magnetic head surfaces 52 coplanar therewith) with the magnetic coatings on the disc faces. As will be readily apparent, the pressure of the corner jets from ports 48 against the disc surfaces acts in opposition to the central jet from duct 46 against the crosswall 400, and tends to lift the bevel surfaces 44 and 114 off the associated swivel heads 40 and 75. As earlier noted, the swivel heads 75 of the applicator shoes 77 and 78 are smaller in diameter than the swivel heads 40 of the backing shoes 41, and the relative dimensioning is such that in the final equlibrium position of the disc 5 and the lateral shoes, when the active surfaces 50 of the shoes are spaced from the associated disc surfaces 57 and 58 by the desired airgap *e*, the backing shoes 41 are still positioned in their initial projected position with bevel surface 44 bearing against swivel head 40, whereas applicator shoes 77 and 78 are now partly retracted by the repelling action of the corner jets from ports 48, so that said shoes assume an intermediate position in which the bevel surface 114 is lifted off the swivel head 75, as shown in FIGS. 9 and 10.

This can best be understood by the following summary analysis. Let $s_1$ designated the transverse cross-sectional area of the swivel head 40 (and bore 43) in a lateral shoe of the backing set 41, and $s_2$ the cross-sectional area of the swivel head 75 (and bore 115) in a lateral shoe of the applicator set 77, and shoe 78. Further, let $s'$ designate the area of each of the four corner recesses 49 over which the corner jets from ports 48 of each one of the lateral shoes are applied, the areas $s'$ being here assumed to be equal in all the shoes. The pressure created in the space above crosswall 400 by the air issuing from central duct 46 is substantially the same as the supply pressure $p$. Hence the force tending to move a shoe 41 to its fully projected position, in which bevel surface 44 is applied against swivel head 40, is $f_1=ps_1$. Similary the force tending to move a shoe 77 or 78 to its fully projected position is $f_2=ps_2$. The air pressure created in each of the four shallow corner recesses 49 is $p'$, substantially less than $p$, for instance with $p'\approx\frac{1}{2}p$. Hence the force tending to retract a shoe from its fully projected position is $f'=4p's'$.

Considering a shoe of applicator set 77, or shoe 78, it is desired that in the equilibrium condition in which the active surfaces 50 of the shoe are spaced by the prescribed airgap $e$ from the disc surface, the shoe shall be in a partially projected, i.e. floating, position with bevel surface 114 disengaging swivel head 75. This means that we should have $f_2=f'$, or $ps_2=4p's'$. At the same time, since $ps_1>4p's'$, we shall then have $f_1>f'$, so that the backing-shoes 41 will be in their fully projected position, as desired herein. Assuming $p'=\frac{1}{2}p$, the desired relationship can be obtained by a relative dimensioning such that $s_2=2s'$, and $s_1>2s'$. Clearly, however, the pressure and dimensional relationships just indicated are exemplary only, and other suitable relationships can be used to achieve the operating characteristics of the invention, as disclosed herein.

As earlier described, the rocking of each shoe about its spherical swivel head 40 or 75 is restricted in amplitude by the provision of a flange such as 45 on the shoe-supporting shank 39 or 73. The spacing between the cooperating edges of flange 45 and the shoe is made sufficient to enable the shoe to orient itself universally in the angular range required to compensate for the maximum angling of the memory disc, as determined mainly by the clearance provided between the disc and the guiderails 87 and 88. The lateral shoe assemblies are so constructed that the center of gravity of the assembly, including the magnetic heads carried thereby, substantially coincides with the center of the supporting swivel head 40 or 75. This ensures that the torque required to tilt the shoe in any direction about its swivel is extremely low, and is well within the capability of the air jets.

Thus, in the operative condition of the memory device of the invention, with air pressure applied to the segmental centering shoes 21–24, the lateral positioning, magnetic-head-carrying shoes 41, 77 and 78, and the actuator 84, the memory disc 5 is floatingly but stably supported in a vertical position at substantially equal distances between the magnetic heads. When the disc is set in rotation, as through energization of the spinning airjet 106, the magnetic heads 42 will read, erase and record information in the form of states of magnetization in the magnetic coatings on both sides of the disc, in a generally conventional way, under control of external computer circuitry, not shown, of any suitable type connected to the magnetic heads.

As will be evident from FIG. 2 and the previous description thereof, the exemplary embodiment of the invention here disclosed provides four assemblies of magnetic heads space circumferentially around the axis of the memory disc 5 at each side of the disc, each assembly being supported by a related one of the side shoes 41 and 78 at one side of the disc, and 77 at the other side. In each assembly, i.e. each shoe, there is provided an array of magnetic heads disposed in a plurality of radially extending rows or banks, there being e.g. four such radial banks per shoe as shown in FIGS. 8 and 9.

It will be understood that the magnetic coating on each side of the disc 5 is provided with a multiplicity of concentric circumferential record tracks thereon, each track being served by a related one of the magnetic heads, positioned at a radial distance from the center of disc 5 that corresponds to the radius of the particular record track. Preferably, adjacent magnetic heads in any particular radial bank do not serve adjacent circumferential tracks, since this would require positioning such adjacent heads excessively close to each other and promote objectionable crosstalk between the record tracks. Instead, the memory tracks and magnetic heads are associated in a suitable interlaced pattern. Conveniently this pattern may be as shown in the following table, in which the Roman numerals are used to designate the four radial banks of magnetic heads provided in one side shoe, numbered e.g. as in FIG. 8. The memory tracks on the disc may be assumed to be numbered consecutively radially outward across the disc, and while only 20 memory tracks are referred to in the table obviously a much greater number may be used.

| Bank No. | Memory track No. | | | | | | | | | | | | | | | | | | | |
|---|---|---|---|---|---|---|---|---|---|---|---|---|---|---|---|---|---|---|---|---|
| I | 1 | — | — | — | 5 | — | — | — | 9 | — | — | — | 13 | — | — | — | 17 | — | — | — |
| II | — | — | 3 | — | — | — | 7 | — | — | — | 11 | — | — | — | 15 | — | — | — | 19 | — |
| III | — | 2 | — | — | — | 6 | — | — | — | 10 | — | — | — | 14 | — | — | — | 18 | — | — |
| IV | — | — | — | 4 | — | — | — | 8 | — | — | — | 12 | — | — | — | 16 | — | — | — | 20 |

As will be noted from FIG. 2, the four side shoes provided on each side face of the disc in the illustrated example are positioned in register with two different annular bands of the related disc face, the two annular bands containing equal numbers of circumferential record tracks. The magnetic heads in the respective shoes of each such pair are associated with the record tracks of the common annular band associated with said pair, likewise in accordance with an interleaved pattern. That is, if the table given above is taken as representing the relationship of the magnetic heads of one shoe, such as the shoe designated A in FIG. 2, with the record tracks of the inner annular band of the disc face, then the relationship of the magnetic heads of the other shoe B of the same pair with the record tracks of said inner annular band would be given by a similar table in which the record tracks would be numbered 1', 2', 3', . . . , wherein track 1' is positioned between tracks 1 and 2, track 2' between tracks 2 and 3, and so on.

It will readily be understood that such a staggered arrangement makes it possible to serve a great many record tracks by means of fixedly positioned heads, without having to reduce unduly the radial pitch spacing between the heads. In fact, the arrangement described above makes it possible to multiply by a factor of eight the radial pitch spacing between adjacent magnetic heads in each radial bank, as compared to the pitch spacing between adjacent magnetic tracks. The danger of crosstalk accompanying too close a spacing between magnetic heads is thereby avoided.

It is to be noted that in the construction disclosed wherein the backing shoes 41, in operation, are at a fixed axial position relative to the stationary structure in view of the normal engagement between the bevel surface 44 of said shoes 41 and the spherical swivel head 40 as above described, the said backing shoes 41 act as positive positioning means for the plane of the memory disc 5, and since three points define a plane, such positive positioning shoes should, in principle, be three and only three in number for best performance. It is for this reason that the fourth shoe 78, provided on the same side of the disc as the three backing or positive positioning shoes 41, is constructed in the manner earlier described, similar to the shoes of the opposite "applicator" set 77 i.e. with a swivel head 75 of a reduced diameter so that, in the operative condition, said shoe will not be positively abutted as are the backing shoes 41 but instead will be held in axial floating position by the opposing air pressures. Thus, the pair of opposite shoes constituted by this last shoe 77 and the confronting shoe 78 will not disturb the precise isostatic lateral support of the memory disc 5, while enabling four (or more) sets of magnetic heads so be used on each side.

The construction and mounting means disclosed herein for the lateral positioning, magnetic-head-carrying shoes ensures a high degree of safety against objectionable contacts with the disc, capable of damaging the delicate magnetic record-bearing coating thereon, during operation of the device. This makes possible the reliable use of extremely small magnetic airgaps, of the order $e=3\pm1$ microns, which in turn permits a very high density of information recording on the disc. It should be observed in this connection that in view of the small airgaps used, the energy required to move the disc and shoe into contact with each other is quite low, so that there would appear to be a definite danger of such unwanted contact occurring. However, the construction of the lateral shoe-mounting means herein disclosed is such that said shoes will be forced back on their swivel heads by the increasing pneumatic pressure should the airgap be reduced below a prescribed danger value, thereby again avoiding contact with the disc surface. This can be shown as follows.

Let $p''$ be the pressures created over the corner pressures areas 49 of a backing shoe 41 when the airgap $e$ is reduced to the said risk value, indicating imminent risk of contact with the disc surface. The danger pressure level $p''$ is substantially higher than the nominal pressure level (called $p'$ above) created in said corner areas in the correct equilibrium position, but is still substantially lower than the supply pressure level $p$. The cross-sectional area, above called $s_1$, of the swivel head 40 is such that $ps_1<4p''s'$. Thus, recalling an inequality stated hereinabove, it is seen that by dimensioning the section area $s_1$ of the swivel head 40 of the side shoes 41 so that $$4p's'<ps_1<4p''s'$$

where $p'$ represents the prescribed or nominal pressure on the corner areas 49, $p''$ represents the maximum safety pressure on said corner areas, and $p$ is the supply pressure, the backing shoes 41 will during normal operation retain their fully projected positions with bevel surfaces 44 engaging the swivel head 40, thereby positively determining the lateral position of disc 5, but will, in case of a momentary increase in air pressure indicative of imminent contact with the disc, due for example to a warped surface or other defect of the disc, immediately collapse to a retracted position in which the bevel surface 44 disengages swivel head 40, until such over-pressure has been dissipated, thereby preventing contact with the disc and damage to the magnetic coating.

Finally, the assembly according to our invention preferably includes additional safety means for preventing damage to the sides of the disc 5 in case of an accidental failure in the pressure-fluid delivery system. As shown in the highly schematic view of FIG. 13, the pressure-fluid source 200, such as an air pump, has a discharge manifold 202 connected by branch feeder lines 204, 206 and 208 to the spinning nozzles 106, the segmental centering shoes 21–24, and the actuating finger 84, respectively. A further feeder line 210, leading to the lateral positioning shoes 41, 77 and 78, is connected to manifold 202 by way of a reservoir chamber 212 and a check valve 214 preventing backflow from said chamber to manifold 202. A feeder line 216 leading to the braking air nozzles 107 is connected to a separate source of pressure air, e.g. a reservoir 218, by way of a normally closed valve 220. Reservoir 218 may, as shown, be fed from manifold 202 through a check valve 219; valve 220 is pressure-operated, being moved to its open condition in response to a predetermined drop in the pressure in manifold 202 as sensed by a pressure pick-off 222. The system operates as follows.

In normal operation air is supplied under a prescribed pressure from pump manifold 202 to the feeder lines 204, 206 and 208, thereby maintaining the memory discs 5 in rotation by the spinning nozzles 106, and in air-suspended floating condition by the action of the segmental shoes 21–24, at the same time keeping the actuator finger 84 projected to hold the movable plate 59, disc 5 and lateral shoes 41, 77 and 78 in their prescribed operating positions. At this time valve 220 is closed so that feeder line 216 does not supply pressure air to braking nozzles 107.

In the event of a failure in the pressure system, producing a drop in the pressure in manifold 202, feeder lines 204, 206 and 208 are no longer properly supplied. Pressure sensor 222 opens valve 220, applying pressure air from standby source 218 through feeder 216 to the retarding nozzles 107, so that the rotation of disc 5 is progressively braked. Since the segmental shoes 21–24 are no longer supplied, the disc 5 drops from its floating condition into frictional contact with the segmental shoes by way of its flanged rim 103, without any objectionable consequence. Since actuator 84 is now deenergized, movable plate 59 is shifted to its retracted (rightward) position in engagement with the stops 79 by the action of springs 83. The side shoes 77 are thereby moved away from the disc 5, and disc 5 is moved away from the side shoes 41 and 78, through the mechanism earlier described. Owing to the provision of reservoir chamber 212, the side shoes 41, 77 and 78 remain supplied with air at prescribed pressure throughout the time required to move the side shoes out of operative relationship with the disc and to bring the disc to a standstill, thereby preventing damage to the magnetic coatings during this transitional period.

As will be evident, if the electric drive of FIG. 16 is used to spin the disc instead of the pneumatic drive of FIG. 2, the supply system of FIG. 13 can be readily modified to provide for an equivalent safety action. The modifications would essentially involve replacing the feed lines 204 and 216 by electric supply lines, and providing pressure-actuated switches in said supply lines controlled by pick-offs responsive to prescribed pressure values present in air-supply manifold 202.

A large number of other departures and modifications may be introduced into the exemplary embodiment herein disclosed without departing from the scope of the invention. Thus, while the invention has until now been embodied only in a magnetic memory, other types of information-transfer means may be used, e.g. opto-electric or opto-magnetic effects, such as the Kerr effect.

Instead of using jets of pressure fluid, preferably air, in the peripheral positioning members 21–24 for the centerless support of the disc, and/or in the side positioning members 41–78 and 77 for accurately determining the lateral position of the disc and the magnitudes of the airgaps, force-developing means other than jets of pressure fluid may be used. It is contemplated in this connection that magnetic effects such as eddy currents can be used with substantially equivalent results. For this purpose, the body of the memory disc may be made of a non-magnetic, electrically conductive metal, e.g. aluminum alloy. The side shoes 41–78 and 77, and/or the peripheral shoes 21–24, may then be provided with electromagnet means for generating strong eddy currents in the metal body of the disc which would increase sharply when the spacing between the shoes and the disc is reduced. Various other modifications are conceivable.

In one practical embodiment of the invention, the discs were made of Teflon and were 450 mm. in diameter and 8 mm. thick. Each side face of the disc carried 576 concentric record tracks, disposed in two concentric annular bands. The pitch spacing of the record tracks in each band was about 5 tracks per millimeter radius.

Each of the two side shoes associated with each annular information band as earlier described was fitted with four radial banks of magnetic heads, with 36 heads per bank. The radial pitch spacing between adjacent magnetic heads in each bank was only about 6 per centimeter.

Tests have shown that with the mounting means described, the lateral position of each disc face could be maintained in a prescribed plane to within about ±1 micron, and the airgaps between the magnetic heads and disc side faces could be consistently held at 3 microns ±1 micron. Since the heads are stationary and permanently associated with their related record tracks so that scanning movements are unnecrssary, so-called immediate access is obtained. This means that the mean time is determined by the time taken by one half-revolution of the disc, and in this embodiment the disc was spun at about 1500 r.p.m., so that the mean access time was 0.02 second. Another very valuable feature of the improved disc memory device is the ready removability and interchangeability of the memory discs, which enormously increases the versatility of programming operations and information storage.

What we claim is:

1. A memory device comprising:
- a memory disc having a record medium on at least one sideface;
- means supporting the disc for rotation without positive restraint against limited axial displacement;
- means for driving the disc in rotation;
- backing means cooperating with the opposite sideface of the disc;
- a lateral positioning member adjacent said one disc sideface;
- means mounting said member for limited axial displacement relative to said disc and said backing means;
- means in said member defining a reference surface generally parallel to the disc;
- force-developing means in said member cooperating with said disc for controlling the axial distance between said one disc sideface and said reference surface; and
- an information-transfer head mounted in said member for coaction with said record medium and a predetermined axial position with respect to said reference surface, whereby to maintain a prescribed operating clearance between said head and said medium.

2. A device as defined in claim 1, wherein said backing means comprises:
- a set of three angularly-spaced backing members, and force-developing means in each backing member cooperating with said opposite disc sideface for resiliently restraining the disc against displacement towards said backing members beyond a prescribed operating position.

3. The device defined in claim 2, wherein said disc has a further record medium on said opposite sideface, and a further magnetic head secured in said backing members for cooperating with said further magnetic medium.

4. The device defined in claim 2, wherein there are three of said lateral positioning members arranged adjacent said one sideface of the disc in angularly spaced positions corresponding to the angular positions of said backing members.

5. The device defined in claim 2, wherein said force-developing means in each backing member comprises pressure-fluid-delivery passage means in said member connectable with a source of pressure fluid and having discharge-orifice means cooperating with an area of said opposite disc sideface for developing a first force tending to increase the distance between said sideface and backing member, and cooperating with a reaction area for developing a second, reaction, force tending to decrease said distance, said areas being so relatively determined that said second force predominates over said first force in the normal operation of said device.

6. The device defined in claim 1, wherein said force-developing means in said lateral positioning member comprises pressure-fluid-delivery passage means connectable with a source of pressure fluid and having discharge-orifice means cooperating with an area of said first disc sideface for developing a first force tending to increase the distance between said sideface and member, and cooperating with a reaction area for developing a second, reaction, force tending to decrease said distance, said areas being so relatively determined that said first and second forces substantially balance each other in the normal operation of said device.

7. The device defined in claim 1, wherein said disc supporting means support the disc in a centerless floating condition.

8. A memory device comprising:
- a memory disc having a record medium on at least one sideface;
- means supporting the disc for rotation without positive restraint against limited axial displacement and drive means for rotating the disc;
- a set of lateral positioning members arranged in angularly spaced relation adjacent each of the disc sidefaces;
- means mounting said members for limited axial displacement;
- means in each member defining a reference surface generally parallel to the disc sidefaces;
- oppositely effective force-developing means in said members cooperating with the respective disc sidefaces for controlling the axial distance between the disc sidefaces and the reference surfaces of the respective sets of members; and
- information-transfer heads secured in at least one of said members in predetermined position with respect to the associated reference surface, whereby to maintain a prescribed operating clearance between said heads and confronting the disc sideface.

9. The device defined in claim 8, wherein said force-developing means comprises:
- means developing a first force in a direction to increase said axial distance, said first force increasing as said distance decreases;
- and means developing a second, reaction, force in a direction to decrease said axial distance;
- said first and second forces being capable of balancing each other in a prescribed operating mode of said device.

10. The device defined in claim 8, wherein said force-developing means comprises:
- fluid delivery passages in said members connectable to a source of pressure fluid and having discharge orifices;
- first areas on the disc sidefaces cooperating with said orifices to produce first fluid-pressure forces tending to increase said axial distances, which first forces increase as said distances decrease;
- and reaction areas cooperating with said orifices to produce reactive second fluid-pressure forces tending to reduce said axial distances;
- said first and reaction areas being so relatively dimensioned that said first and second forces are capable of balancing each other in each lateral positioning member for a prescribed operating mode of the device.

11. The device defined in claim 10, wherein the relative dimensioning of said areas is such that in a member of one set said first and second forces balance each other during normal operation of the device while in a member of the other set said second force predominates over said first force during normal operation of the device.

12. The device defined in claim 8, including:

means mounting said members both for limited axial displacement and for limited universal movement, and means preventing relative rotation of the members about an axis parallel to the disc axis and preventing relative translation of said members in a plane normal to the disc axis.

13. The device defined in claim 8, wherein said disc has record media on both of its sidefaces, and there are information-transfer heads secured in members of both sets for coaction with the record media of the associated sidefaces.

14. The device defined in claim 8, wherein there are three angularly-spaced members in one set and three members in the other set positioned in confronting relation to the members of said one set.

15. A memory device comprising:

a memory disc having a record medium on at least one sideface;

centerless means supporting the disc for rotation without positive restraint against radial and axial displacements and drive means for rotating the disc;

lateral positioning members mounted adjacent the opposite sidefaces of the disc and each having means defining a reference surface generally parallel to the disc sideface;

oppositely effective force-developing means in said members coacting with the associated disc sidefaces for controlling the spacing between said reference surfaces and disc sidefaces; and an information-transfer head secured in at least one of said members in predetermined axial relationship with the reference surface thereof, whereby to maintain an accurately prescribed operating clearance between said head and record medium despite the absence of any positive restraint of the disc against axial displacement.

16. The device defined in claim 15, including:

respective mounting structures supporting the lateral positioning members on the respective sides of the disc; and means for relatively displacing said structures axially towards and away from each other between an operative position in which the opposite members are supported a minimum distance apart and a retracted position in which said opposite members are supported a greater distance apart for ready insertion and removal of the disc into and from its centerless supporting means.

17. The device defined in claim 15, wherein one of said mounting structures is stationary relative to the disc supporting means, said disc is vertical, and the other mounting structure comprises a platelike member, further comprising swivelable suspension means for vertically supporting said platelike member for substantially frictionless, non-rotational translation parallel to the disc axis, and actuator means for displacing the plate-like member between said operative and retracted positions.

18. The device defined in claim 17, further including:

paired guide-rail means supported to extend across the opposite sidefaces of the disc freely to restrain the disc therebetween;

means supporting the guiderail means for bodily movement parallel to the disc axis; and linkage interconnecting the guiderail supporting means and the movable plate-like mounting member so that movement of the latter between its operative and retracted positions will move the guiderail means between corresponding positions, the extent of movement of the guiderail supporting means being about one half the extent of movement of the movable mounting member.

19. A memory device comprising:

a disc rotatable about a horizontal axis and provided on at least one vertical face with a recording medium for the storage of information;

centerless supporting means for said disc enabling limited axial displacement thereof, said supporting means including a peripheral set of nozzles angularly spaced about said disc and two lateral sets of nozzles disposed adjacent opposite sides of said disc in combination with a source of pressure fluid connectable to said sets of nozzles for generating radially and axially oriented fluid jets directed onto the periphery and the vertical faces of said disc; and information-transfer means mechanically connected with at least one of said lateral sets of nozzles in confronting relationship with said one face for co-operation with said recording medium.

20. The device defined in claim 19, wherein said disc is provided with an axially projecting rim overhanging said recording medium, said supporting means including an elongated member spanning said rim at said one face, yieldable means holding said member in contact with said disc, relatively axially movable first and second mounting means for said lateral sets of nozzles, actuating means for separating said first and second mounting means sufficiently to enable free extraction of said disc from between said lateral sets of nozzles, and a mechanical coupling between said mounting means and said member for maintaining said disc substantially equispaced from said lateral sets of nozzles in the absence of said fluid jets upon relative displacement of said mounting means.

21. The device defined in claim 20 wherein said mounting means include holders for said nozzles engaging same with freedom of minor axial displacement, and fluid-responsive biasing means on at least one side of said disc for yieldably urging the nozzles thereat toward the corresponding disc face concurrently with the generation of said fluid jets.

22. The device defined in claim 21 wherein said mounting means include shoes swivelably mounted on said holders and carrying said nozzles, said information-transfer means comprising an array of mangetic heads supported on said shoes with tips coplanar with the outlets of the associated nozzles.

23. The device defined in claim 19 wherein said source includes a separate fluid supply for said lateral sets of nozzles, further comprising pressure-sensing means responsive to failure of fluid pressure in said peripheral nozzles for arresting said drive means while maintaining fluid delivery to said lateral sets of nozzles from said separate supply.

24. The device defined in claim 23 wherein said supporting means includes relatively axially movable first and second mounting means, yieldable means tending to move said first and second mounting means apart, and fluid-operated actuating means connected to said source in parallel with said peripheral nozzles for enabling separation of said first and second mounting means by said yieldable means upon failure of fluid pressure in said peripheral nozzles.

25. The device defined in claim 19, further comprising drive means for rotating said disc about its axis, said recording medium including a multiplicity of circumferential record tracks centered on said axis, said information-transfer means comprising a multiplicity of heads adjacent said one face mounted with a predetermined clearance therefrom for coaction with respective record tracks, said heads being disposed in a plurality of angularly spaced radial rows around said axis, radially adjoining heads in each row being positioned for coaction with mutually non-adjoining record tracks whereby the radial separation of the heads in each row is a multiple of the radial separation of successive tracks.

26. The device defined in claim 25, wherein said drive means comprise pressure-fluid-discharge nozzles and cooperating surface formations on said disc arranged for receiving fluid jets discharged by the last-mentioned nozzles.

27. The device defined in claim 25, wherein said drive means comprise electric motor means and means for disengageably coupling the disc for rotation by said motor means while permitting ready insertion and removal of the disc into and from its centerless supporting means.

28. A disc memory assembly comprising a plurality of memory devices each constructed and arranged in accordance with claim 8, said devices being identically dimensioned to permit the selective interchangeable insertion of any one of a plurality of generally identical memory discs into any one of said devices.

References Cited

UNITED STATES PATENTS

| | | | |
|---|---|---|---|
| 2,854,298 | 9/1958 | Baumister | 340—174.1 |
| 2,915,593 | 12/1959 | Brown | 170—100.2 |
| 3,029,416 | 4/1962 | Quade | 340—174.1 |
| 3,071,757 | 1/1963 | Levene | 179—100.2 |
| 3,336,583 | 9/1967 | Comstock, 3d | 179—100.2 |
| 3,381,285 | 4/1968 | Wallen | 340—174.1 |
| 3,401,383 | 9/1968 | Ault | 340—174.1 |
| 2,916,728 | 12/1959 | Gilson | 179—100.2 |

BERNARD KONICK, Primary Examiner

V. P. CANNEY, Assistant Examiner

U.S. Cl. X.R.

274—10